(12) United States Patent
Inomata et al.

(10) Patent No.: US 11,581,143 B2
(45) Date of Patent: Feb. 14, 2023

(54) MULTILAYER CERAMIC CAPACITOR AND MANUFACTURING METHOD FOR SAME

(71) Applicant: TAIYO YUDEN CO., LTD., Tokyo (JP)

(72) Inventors: Yasuyuki Inomata, Takasaki (JP); Tomoya Hagiwara, Takasaki (JP); Kazumi Kaneda, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 312 days.

(21) Appl. No.: 16/915,839

(22) Filed: Jun. 29, 2020

(65) Prior Publication Data

US 2021/0020364 A1 Jan. 21, 2021

(30) Foreign Application Priority Data

Jul. 17, 2019 (JP) .............................. JP2019-131810

(51) Int. Cl.
*H01G 4/12* (2006.01)
*C04B 35/46* (2006.01)
*C04B 35/468* (2006.01)
*C04B 35/626* (2006.01)
*H01G 4/30* (2006.01)

(52) U.S. Cl.
CPC ....... *H01G 4/1227* (2013.01); *C04B 35/4682* (2013.01); *C04B 35/62605* (2013.01); *H01G 4/30* (2013.01); *C04B 2235/3206* (2013.01); *C04B 2235/3224* (2013.01); *C04B 2235/3239* (2013.01); *C04B 2235/3244* (2013.01); *C04B 2235/3262* (2013.01);

(Continued)

(58) Field of Classification Search
CPC ................ H01G 4/1209; H01G 4/1227; C04B 35/4682; C04B 35/62605
See application file for complete search history.

(56) References Cited

U.S. PATENT DOCUMENTS 5,296,425 A * 3/1994 Chazono .............. H01G 4/1245
501/138
8,008,222 B2 * 8/2011 Shibasaki ............ H01G 4/1227
501/138

(Continued)

FOREIGN PATENT DOCUMENTS

JP   H11302071 A   11/1999
JP   2011105571 A   6/2011

*Primary Examiner* — Mark Kopec
(74) *Attorney, Agent, or Firm* — Law Office of Katsuhiro Arai

(57) ABSTRACT

A multilayer ceramic capacitor (10) has a laminate body (20) constituted by dielectric layers (17) and internal electrode layers (18) stacked alternately. The dielectric layers (17) contain $(Ba_{1-x-y}Ca_xSr_y)_m(Ti_{1-z}Zr_z)O_3$, where $0.03 \leq x \leq 0.16$, $0 \leq y \leq 0.02$, $0 < z \leq 0.02$, $0.99 \leq m \leq 1.02$, as a primary component, and an R oxide (R is a rare earth element) by 1.0 to 4.0 mol in equivalent element, an Mg compound by 0.2 to 2.5 mol in equivalent element, an Mn compound by 0.1 to 1.0 mol in equivalent element, a Zr compound by 0.1 to 2.0 mol in equivalent element, a V compound by 0.05 to 0.3 mol in equivalent element, and an Si compound by 0.2 to 5.0 mol in equivalent element, per 100 mol of the primary component. The multilayer ceramic capacitor can offer excellent DC bias properties and ensure high reliability.

7 Claims, 4 Drawing Sheets

(52) U.S. Cl.
CPC ............... *C04B 2235/3418* (2013.01); *C04B 2235/5445* (2013.01); *C04B 2235/79* (2013.01)

(56) References Cited

U.S. PATENT DOCUMENTS

| | | | | |
|---|---|---|---|---|
| 2007/0142210 | A1* | 6/2007 | Muto | H01G 4/30 |
| | | | | 501/138 |
| 2011/0122541 | A1* | 5/2011 | Nakamura | C04B 35/62645 |
| | | | | 501/138 |
| 2014/0063686 | A1* | 3/2014 | Kang | H01G 4/30 |
| | | | | 361/301.4 |

* cited by examiner

[FIG. 1]
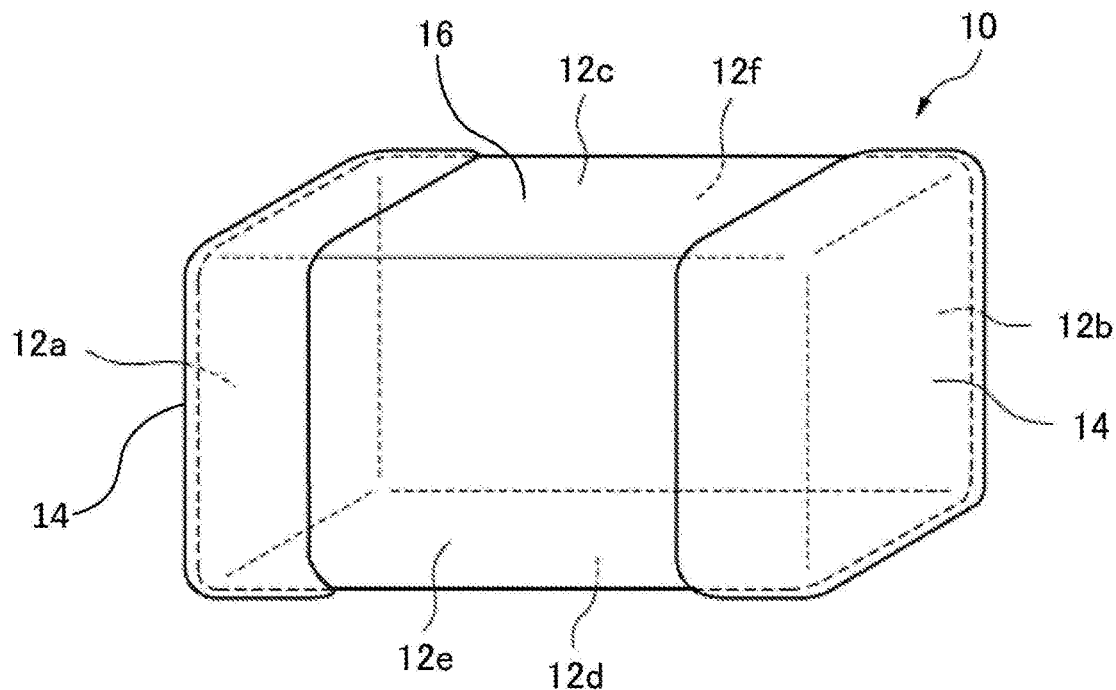
[FIG. 2]
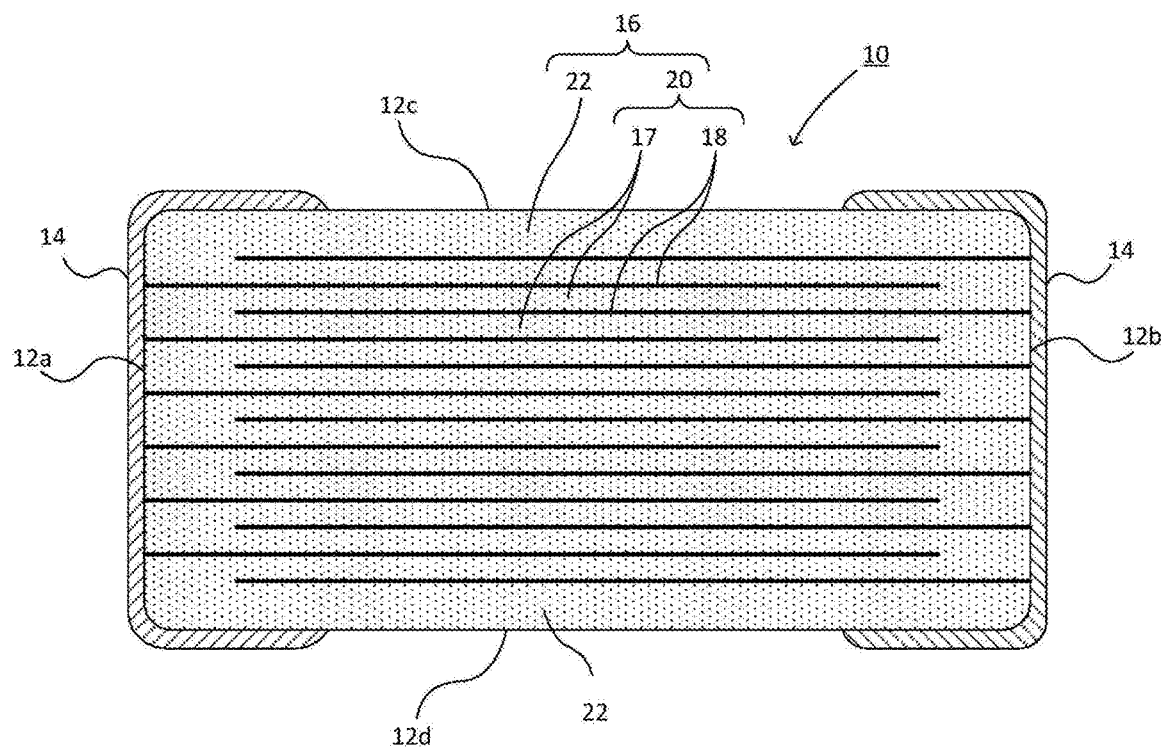

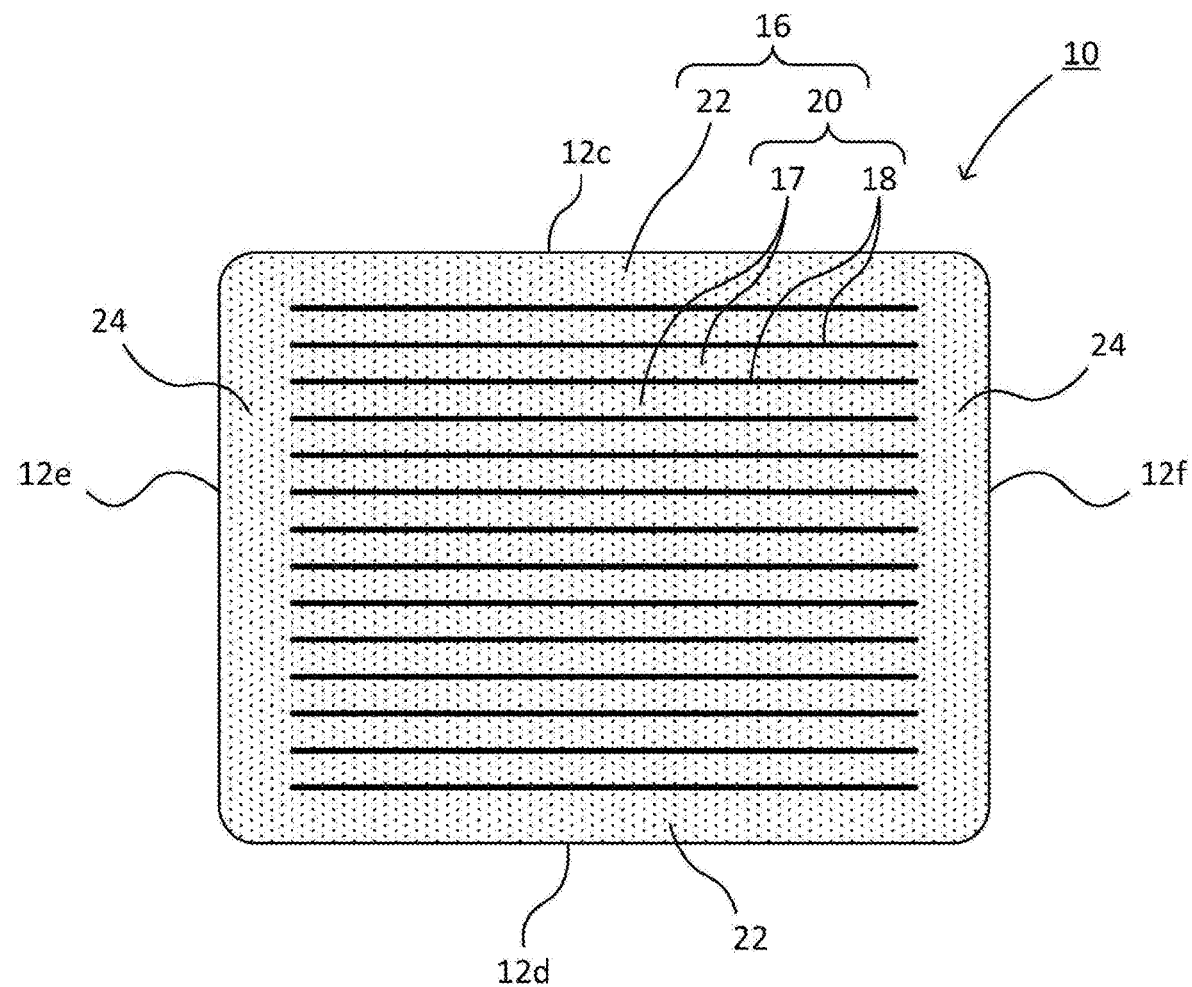

[FIG. 4]
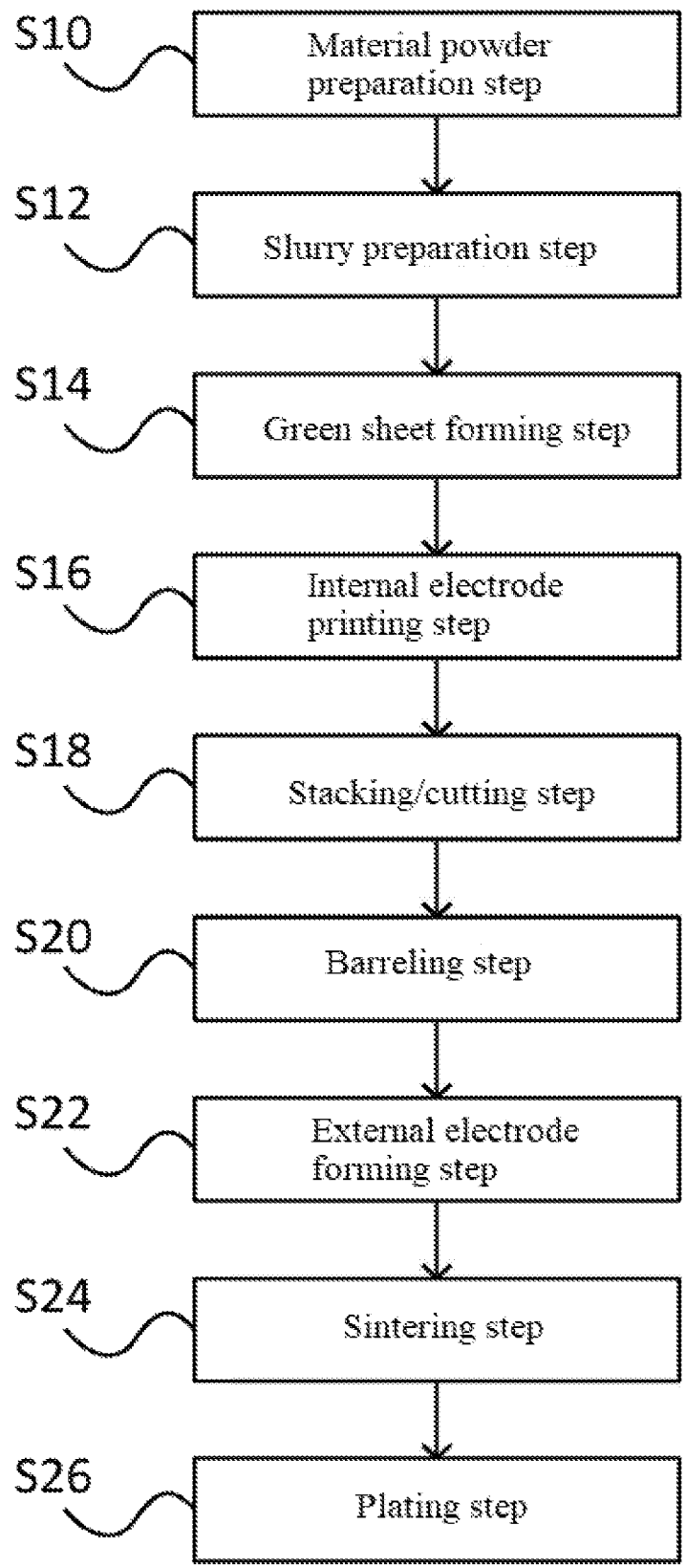

[FIG. 5]
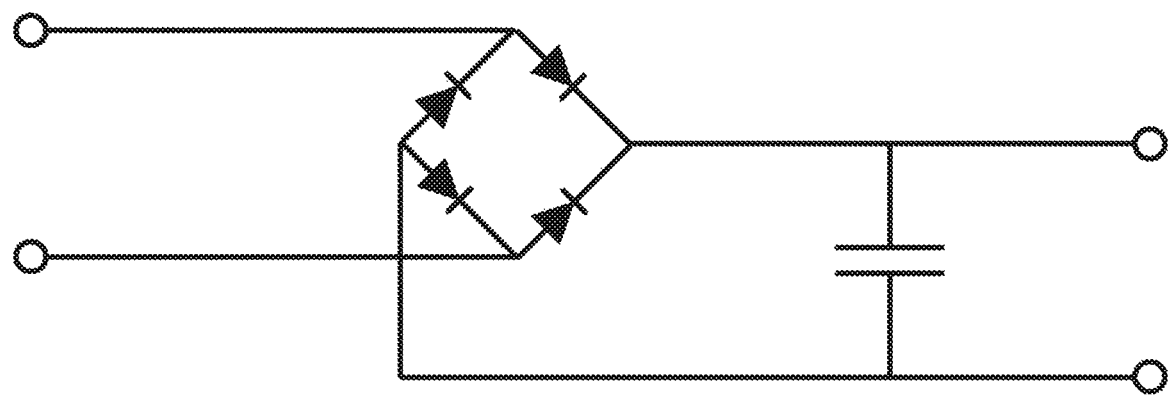

MULTILAYER CERAMIC CAPACITOR AND MANUFACTURING METHOD FOR SAME

BACKGROUND

Field of the Invention

The present invention relates to a multilayer ceramic capacitor and a manufacturing method for the same.

Description of the Related Art

Dielectric materials containing $BaTiO_3$ as a primary component have been used for multilayer ceramic capacitors, especially multilayer ceramic capacitors of high dielectric constants. Numerous types of dielectric materials have been proposed to date that use primary components of different grain sizes as well as additives of different types by different quantities, etc., and suitable dielectric materials are used for specific purposes. In addition to the dielectric materials containing $BaTiO_3$ as a primary component, dielectric materials containing a different element to partially replace Ba are proposed. For example, dielectric materials containing Ca to partially replace Ba are in practical use.

Patent Literature 1 discloses a multilayer ceramic capacitor having dielectric layers constituted by a dielectric ceramic expressed by the general formula $\{Ba_{1-x}Ca_xO\}_m TiO_2 + \alpha MgO + \beta MnO$. It is disclosed that, according to this art, a multilayer ceramic capacitor offering capacitance vs. temperature characteristics that meet the EIA-specified X7R standard, excellent bias properties, and longevity, can be obtained.

Patent Literature 2 discloses a multilayer ceramic capacitor having dielectric layers constituted by a dielectric ceramic whose primary component is $(Ba_{1-x}Ca_x)TiO_3$ (where $0.045 \leq x \leq 0.15$). It is disclosed that, according to this art, a multilayer ceramic capacitor can be obtained that ensures high reliability against temperature change and mechanical shock without having to sacrifice the dielectric constant or longevity under high-temperature load.

BACKGROUND ART LITERATURES

| | |
|---|---|
| [Patent Literature 1] | Japanese Patent Laid-open No. Hei 11-302071 |
| [Patent Literature 2] | Japanese Patent Laid-open No. 2011-105571 |

SUMMARY

In recent years, dielectric layers in multilayer ceramic capacitors are becoming increasingly thinner. Their rated voltages are also rising, with the resulting electric field strengths reaching anywhere between 10 and as much as 20 V/μm.

When DC voltage is applied to $BaTiO_3$ or other material exhibiting strong dielectric property, its dielectric constant drops (in a capacitor, the capacitance of the capacitor drops). When it comes to multilayer ceramic capacitors for smoothing circuits, importance is placed on the capacitance under DC voltage application (effective capacity). These DC bias properties are affected by, for example, the size and composition of the grains that constitute the dielectric body, but they are particularly, and significantly, affected by the dielectric constant of the dielectric body. If the dielectric constant is 5000 or higher, for example, the effective capacity under DC voltage application drops dramatically. Sufficient effective capacity cannot be ensured even when the dielectric constant is 3000, for example. Lowering the dielectric constant further increases the effective capacity, but doing so gives rise to a product design requirement of reducing the dielectric layer thickness. Once the dielectric layer thickness is reduced, ensuring high reliability becomes difficult for a multilayer ceramic capacitor with a high rated voltage. Accordingly, the conventional multilayer ceramic capacitors have the problem that simultaneously solving the two challenges of ensuring effective capacity and offering longevity under a high rated voltage is difficult.

According to the art disclosed in Patent Literature 1, a multilayer ceramic capacitor offering excellent bias properties and longevity can be obtained. However, it cannot be said that its bias properties are excellent enough to achieve further size reduction and capacity increase for the multilayer ceramic capacitor.

According to the art disclosed in Patent Literature 2, a dielectric body with a high dielectric constant can be obtained; however, a problem still remains that, when it is used in a multilayer ceramic capacitor, its effective capacity will drop.

Accordingly, an object of the present invention is to provide a multilayer ceramic capacitor which offers excellent DC bias properties and is capable of ensuring high reliability even when its dielectric layer thickness is reduced, as well as a manufacturing method for such multilayer ceramic capacitor.

Any discussion of problems and solutions involved in the related art has been included in this disclosure solely for the purposes of providing a context for the present invention, and should not be taken as an admission that any or all of the discussion were known at the time the invention was made.

The means for solving the problems are as follows:

[1] A multilayer ceramic capacitor having a laminate body constituted by dielectric layers and internal electrode layers stacked alternately, wherein the dielectric layers contain: $(Ba_{(1-x-y)}Ca_xSr_y)_m(Ti_{(1-z)}Zr_z)O_3$, where $0.03 \leq x \leq 0.16$, $0 \leq y \leq 0.02$, $0 \leq z \leq 0.02$, $0.99 \leq m \leq 1.02$, as a primary component; as well as an R oxide (R collectively refers to one or more rare earth elements) by 1.0 to 4.0 mol in equivalent element of R in total; an Mg compound by 0.2 to 2.5 mol in equivalent element of Mg per 100 mol of the primary component; an Mn compound by 0.1 to 1.0 mol in equivalent element of Mn per 100 mol of the primary component; a V compound by 0.05 to 0.3 mol in equivalent element of V per 100 mol of the primary component; and an Si compound by 0.2 to 5.0 mol in equivalent element of Si per 100 mol of the primary component.

[2] The multilayer ceramic capacitor according to [1], wherein the R is at least one type of rare earth element selected from the group that includes Gd, Tb, Dy, Ho, Er, Tm, Yb, Lu and Y.

[3] The multilayer ceramic capacitor according to [1] or [2], wherein multiple R's, each corresponding to the aforementioned R, are contained in the dielectric layers, and the average ionic radius of the R's is 0.894 to 0.914 Å.

[4] The multilayer ceramic capacitor according to any one of [1] to [3], wherein the ratio by mol of the total of Ba, Sr and Ca, to the total of Ti and Zr, as contained in the dielectric layers, is 1.000 to 1.030.

[5] A circuit board on which the multilayer ceramic capacitor according to any one of [1] to [4] is mounted as a smoothing capacitor.

[6] A manufacturing method for a multilayer ceramic capacitor, comprising: a step to prepare a material by adding, to 100 mol of a powder whose average grain size is 150 to 200 nm and primary component is $(Ba_{1-x1}Ca_{x1})_{m1}TiO_3$ ($0.03 \leq x1 \leq 0.16$, $0.99 \leq m1 \leq 1.02$), an R oxide (R collectively refers to one or more rare earth elements) by 1.0 to 4.0 mol in equivalent element of R in total, an Mg compound by 0.2 to 2.5 mol in equivalent element of Mg, an Mn compound by 0.1 to 1.0 mol in equivalent element of Mn, an M compound (M collectively refers to one or more elements selected from the group consisting of Ba, Ca, and Sr) by 0 to 5.0 mol in equivalent element of each M, a Zr compound by 0.1 to 2.0 mol in equivalent element of Zr, a V compound by 0.05 to 0.3 mol in equivalent element of V, and an Si compound by 0.2 to 5.0 mol in equivalent element of Si; a step to form green sheets from the material; a step to print internal electrode layers on the green sheets; a step to cut the printed green sheets and stack the cut green sheets to obtain a laminate; a step to cut the laminate to obtain laminate body chips; a step to sinter the laminate body chips; and a step to form external electrodes on each of the laminate body chips.

[7] The manufacturing method according to [6], wherein, in the step to sinter the laminate body chips, the laminate body chips are sintered at a temperature of 1,000° C. or higher for 30 to 300 seconds.

According to the present invention, a multilayer ceramic capacitor offering excellent DC bias properties and being capable of ensuring high reliability even when its dielectric layer thickness is reduced, as well as a manufacturing method for such multilayer ceramic capacitor, can be provided.

In this disclosure, the term "primary" component or the like refers to a first component in quantity (mol, weight, volume, etc., typically in mol, depending on the desired characteristics/properties/usage of the resultant multilayer ceramic capacitor, etc.). In some embodiments, the dielectric layers do not include the component(s) specifically identified or addressed as prior/related art dielectric material in this disclosure. In some embodiments, any one or more elements described as alternative or optional element(s) in the present disclosure can explicitly be eliminated from the ceramic grains. Further, in some embodiments, the material/composition including perovskite powders may consist of required/explicitly indicated elements described in the present disclosure; however, "consisting of" does not exclude additional components that are unrelated to the invention such as impurities ordinarily associated therewith.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

FIG. 1 is a perspective view of a multilayer ceramic capacitor.

FIG. 2 is a schematic view of a cross-section, running parallel to the side faces, of the multilayer ceramic capacitor shown in FIG. 1.

FIG. 3 is a schematic view of a cross-section, running parallel to the end faces, of the multilayer ceramic capacitor shown in FIG. 1.

FIG. 4 is a flowsheet showing an example of how a multilayer ceramic capacitor is manufactured.

FIG. 5 is an example of a circuit on which the multilayer ceramic capacitor in an embodiment is mounted as a smoothing capacitor, is shown.

DESCRIPTION OF THE SYMBOLS

10 Multilayer ceramic capacitor
14 External electrode
16 Element body
17 Dielectric layer
18 Internal electrode layer
20 Laminate body
22 Cover layer
24 Side margin

DETAILED DESCRIPTION OF EMBODIMENTS

The multilayer ceramic capacitor pertaining to an embodiment of the present invention, as well as a manufacturing method for such multilayer ceramic capacitor, are explained below by referring to the drawings.

FIG. 1 is a perspective view of the multilayer ceramic capacitor 10 in this embodiment.

As shown in FIG. 1, the multilayer ceramic capacitor 10 comprises an element body 16 which is roughly a rectangular solid. The element body 16 comprises six faces. In this Specification, the left and right faces of the element body 16 are referred to as end faces 12a, 12b, while its top and bottom faces are referred to as principal faces 12c, 12d, and the remaining pair of faces are referred to as side faces 12e, 12f. In FIG. 1, the lateral direction represents the direction in which the internal electrode layers are led out alternately to external electrodes 14. The vertical direction represents the direction in which the internal electrode layers and dielectric layers are stacked alternately.

FIG. 2 is a schematic view of a cross-section, running parallel to the side faces 12e, 12f, of the multilayer ceramic capacitor 10 shown in FIG. 1. FIG. 3 is a schematic view of a cross-section, running parallel to the end faces 12a, 12b, of the multilayer ceramic capacitor 10 shown in FIG. 1.

As shown in FIGS. 2, 3 the multilayer ceramic capacitor 10 comprises an element body 16 and a pair of external electrodes 14 formed on the end faces 12a, 12b of the element body 16. The multilayer ceramic capacitor 10 has dimensions specified by a standard (such as 1.0×0.5×0.5 mm).

The element body 16 comprises a laminate body 20 constituted by multiple dielectric layers 17 and internal electrode layers 18 stacked alternately, and a pair of cover layers 22 formed on the top and bottom faces of the laminate body 20. Furthermore, the element body 16 has side margins 24 that cover and prevent the laminate body 20 (its internal electrode layers 18) from being exposed to the exterior, and form the pair of side faces 12e, 12f (refer to FIG. 3).

On the interior of the element body 16, the multiple internal electrode layers 18 are stacked, with the dielectric layers 17 in between. The end parts of the multiple internal electrode layers 18 are led out alternately to the left and right end faces 12a, 12b of the element body 16, and connected electrically to the external electrodes 14.

The dielectric layers 17 are constituted by a sintered compact which, in turn, is obtained by sintering a material prepared by adding, to 100 mol of a powder whose average grain size is 150 to 200 nm and composition is $(Ba_{1-x1}Ca_{x1})_{m1}TiO_3$ (where $0.03 \leq x1 \leq 0.16$, $0.99 \leq m1 \leq 1.02$), an R oxide (R is a rare earth element) by 1.0 to 4.0 mol in equivalent element, an Mg compound by 0.2 to 2.5 mol in equivalent element, an Mn compound by 0.1 to 1.0 mol in equivalent element, an M compound (M is at least one type of element selected from Ba, Ca and Sr) by 0 to 5.0 mol in equivalent element, a Zr compound by 0.1 to 2.0 mol in equivalent element, a V compound by 0.05 to 0.3 mol in equivalent element, and an Si compound by 0.2 to 5.0 mol in equivalent element. Also, the ratio by mol of the total of Ba, Sr, and Ca, to the total of Ti and Zr, as contained in the material, is 1.000 to 1.030.

The powder whose average grain size is 150 to 200 nm and composition is $(Ba_{1-x1}Ca_{x1})_{m1}TiO_3$ (where $0.03 \leq x1 \leq 0.16$, $0.99 \leq m1 \leq 1.02$) (this powder is hereinafter also referred to as "primary powder") is obtained, for example, by mixing $BaCO_3$, $CaCo_3$, and $TiO_2$ and then sintering the mixture. The average grain size of the primary powder may be adjusted, for example, by crushing using a ball mill. The term "average grain size," as used here, refers to the median diameter (d50) on volume basis measured by observation using a scanning electron microscope (SEM). For example, the median diameter (d50) of the primary powder may be obtained from the measured results of the sizes of n=500 grains in a SEM-observed sample of the primary powder.

While R collectively refers to rare earth elements in general, preferably it is at least one type of rare earth element selected from the group that includes Gd, Tb, Dy, Ho, Er, Tm, Yb, Lu, and Y.

When there are multiple types of R's, preferably their average ionic radius satisfies the condition of between 0.894 and 0914 Å. The term "ionic radius," as used here, refers to Shannon ionic radius for the positive trivalent ions with a six coordination. Examples of Shannon ionic radii are shown in Table 1 below.

TABLE 1

| | | Ionic radius (Å) | |
|---|---|---|---|
| | Valence | 6 coordination | 12 coordination |
| Ba | Positive bivalent | | 1.610 |
| Ti | Positive tetravalent | 0.605 | |
| La | Positive trivalent | 1.032 | |
| Ce | Positive trivalent | 1.010 | |
| Pr | Positive trivalent | 0.990 | |
| Nd | Positive trivalent | 0.983 | |
| Sm | Positive trivalent | 0.958 | |
| Eu | Positive trivalent | 0.947 | |
| Gd | Positive trivalent | 0.938 | |
| Tb | Positive trivalent | 0.923 | |
| Dy | Positive trivalent | 0.912 | |
| Ho | Positive trivalent | 0.901 | |
| Y | Positive trivalent | 0.900 | |
| Er | Positive trivalent | 0.890 | |
| Tm | Positive trivalent | 0.880 | |
| Yb | Positive trivalent | 0.868 | |

Also, the term "average ionic radius," as used here, refers to the weighted average of ionic radii of the R's (rare earth elements) contained in the material powder. For example, assume that three types of rare earth elements are contained in the material and their ionic radii are r1, r2 and r3, respectively. If the ratios by mol of the respective rare earth elements to all of rare earth elements contained in the material are 0.3, 0.2 and 0.5 (where "all" equals 1), the average ionic radius of the R's is calculated as r1x0.3+r2x0.2+r3x0.5.

As described above, an Mg compound, an Mn compound, an M compound (M is at least one type of element selected from Ba, Ca, and Sr), a Zr compound, a V compound, and an Si compound, are added to the primary powder.

The Mg compound is an oxide or carbonate of Mg, for example.

The Mn compound is an oxide or carbonate of Mn, for example.

The M compound is an oxide or carbonate of M, for example.

The Zr compound is an oxide of Zr, for example.

The V compound is an oxide of V, for example.

The Si compound is an oxide of Si, for example.

It should be noted that the compounds of the respective elements to be added may be compounds other than the above.

The ratio by mol of the total of Ba, Sr, and Ca, to the total of Ti and Zr, as contained in the material, is 1.000 to 1.030. By adjusting to the aforementioned ranges the additive quantities of the M compound and Zr compound relative to the primary powder, the final ratio of the respective elements contained in the material can be adjusted as above.

It should be noted that the ratio of each additive element contained in the material as explained above roughly matches the ratio of each additive element contained in the sintered compact (dielectric layers) obtained by sintering the material. For this reason, the ratio of each additive element contained in the material may also be obtained by measuring the ratio of each additive element contained in the dielectric layers. For this measurement, ICP (inductively coupled plasma) atomic emission spectroscopy may be used, for example.

The primary component of the internal electrode layers 18 is a metal material containing at least one type selected from the group that includes nickel, copper, palladium, platinum, silver, gold, and alloys thereof, for example.

The primary component of the external electrodes 14 is a metal material containing at least one type selected from the group that includes nickel, copper, palladium, platinum, silver, gold, tin, and alloys thereof, for example. The external electrodes 14 may be base electrodes constituted by a metal material, with a nickel electroplating layer formed on top. Furthermore, a tin electroplating layer may be formed on top of this nickel electroplating layer.

The thickness of the internal electrode layer 18 and that of the dielectric layer 17 are set to prescribed ranges according to the capacitance, withstand voltage performance, etc., required of the multilayer ceramic capacitor 10. Also, the number of layers in the laminate body 20 is set to several hundreds to thousands or so, for example.

The cover layers 22 and side margins 24 formed around the laminate body 20 have a role of protecting the dielectric layers 17 and internal electrode layers 18 from contamination due to moisture and foreign matter from the exterior.

Preferably the thickness of one dielectric layer 17 is 2 to 10 μm. When the thickness of the dielectric layer 17 is in this range, it means that the thickness of the dielectric layer 17 is sufficiently small and the number of dielectric layers 17 to be stacked can be increased. As a result, the capacity of the multilayer ceramic capacitor 10 can be increased without having to increase the dimensions of the laminate body 20.

Regarding the multilayer ceramic capacitor 10 in this embodiment, the thickness of the cover layer 22, thickness of the side margin 24, and thickness of the internal electrode layer 18, are not limited in any way; however, the thickness of the cover layer 22 is normally 4 to 50 μm, thickness of the side margin 24 is normally 4 to 50 μm, and thickness of the internal electrode layer 18 is normally 0.26 to 1.00 μm.

Next, an example of how the multilayer ceramic capacitor 10 in this embodiment as constituted above is manufactured, is explained by referring to the flowsheet in FIG. 4.

(Material Powder Preparation Step: S10)

First, a material powder from which to form dielectric layers is prepared. To be specific, the material powder is prepared by adding, to 100 mol of a powder whose average grain size is 150 to 200 nm and composition is $(Ba_{1-x1}Ca_{x1})_{m1}TiO_3$ (where $0.03 \leq x1 \leq 0.16$, $0.99 \leq m1 \leq 1.02$), an R oxide (R is a rare earth element) by 1.0 to 4.0 mol in equivalent element, an Mg compound by 0.2 to 2.5 mol in equivalent element, an Mn compound by 0.1 to 1.0 mol in equivalent element, an M compound (M is at least one type of element selected from Ba, Ca, and Sr) by 0 to 5.0 mol in equivalent element, a Zr compound by 0.1 to 2.0 mol in equivalent element, a V compound by 0.05 to 0.3 mol in equivalent element, and an Si compound by 0.2 to 5.0 mol in equivalent element. Here, the additive quantities of the M compound and Zr compound are adjusted, thereby adjusting the ratio by mol of the total of Ba, Sr, and Ca, to the total of Ti and Zr, as contained in the final material powder, to between 1.000 and 1.030.

(Slurry Preparation Step: S12)

A slurry is prepared by adding a dispersant, a binder, and an organic solvent, to the material powder prepared in step S10, and mixing the ingredients. For the dispersant, ammonium polycarboxylate may be used, for example. For the binder, polyvinyl butyral resin or polyvinyl acetal resin may be used, for example. For the organic solvent, ethanol and/or toluene may be used, for example. To evenly disperse the material powder in the slurry, a ball mill may be used, for example, to mix the slurry.

(Green Sheet Forming Step: S14)

The slurry prepared in step S12 is applied in a sheet form on PET (polyethylene terephthalate) films or other carrier films using the doctor blade method, and then dried, to form green sheets. Preferably the thickness of the green sheet is 0.4 to 15 μm.

(Internal Electrode Printing Step: S16)

A conductive paste is applied using the screen printing method, inkjet printing method, gravure printing method, etc., to form prescribed patters on, among the multiple green sheets, those green sheets with which to form internal electrode layers 18. Now, patterns with which to form internal electrode layers 18 have been printed on the green sheets. The primary component of the conductive paste is Ni, Cu, etc., for example.

(Stacking/Cutting Step: S18)

The green sheets on which the patterns have been printed, and the green sheets on which the patterns are not printed, are cut to easy-to-handle sizes. Thereafter, a multiple number of the green sheets on which the patterns have been printed, and a multiple number of the green sheets for cover layers on which the patterns are not printed, are stacked in a prescribed sequence. A multiple number of the green sheets on which the patterns are not printed are stacked on the topmost face, and also on the bottommost face. It should be noted that the multiple green sheets on which the patterns have been printed are stacked by alternately staggering their positions, so that the internal electrode layers will be led out alternately to the external electrodes. The laminate obtained by stacking the multiple green sheets is cut to the sizes of individual products, to obtain laminated body chips. It should be noted that the cutting can be performed in the form of push-cutting, blade dicing, or other known method.

(Barreling Step: S20)

The laminate body chips obtained in step S18 are barreled. This barreling allows for strong adhesion between the element body 16 and the external electrodes 14. It can also prevent the corners of the element body 16 from chipping.

(External Electrode Forming Step: S22)

A conductive paste with which to form a base for external electrode once sintered, is applied on both end faces of the laminate body chips barreled in step S20, and then dried. For this paste, a conductive paste containing Ni can be used, for example.

(Sintering Step: S24)

The laminate body chips on which the conductive paste has been applied in step S22, are sintered at a heating temperature of 1000° C. or higher for 30 to 300 seconds in an atmosphere of $10^{-11}$ to $10^{-8}$ atm in oxygen partial pressure. As a result, element bodies 16 made of ceramics, constituted by the dielectric layers and internal electrode layers formed as one piece, are obtained.

(Plating Step: S26)

Cu, Ni, and Sn electroplating layers are formed, in this order, on the surface of the external electrodes that have been formed on both end faces of the element bodies obtained in step S24. To be specific, the multiple element bodies obtained in step S24 are placed in a barrel together with a plating solution. Next, electricity is applied to the plating solution while turning the barrel. This allows a plating layer to be formed on the surface of the external electrodes that have been formed on both end faces of the element bodies. Cu plating is formed on the external electrodes as a base layer to facilitate the forming of the next Ni plating. Ni plating is formed for the purpose of improving the solder heat resistance of the external electrodes. Sn plating is formed for the purpose of increasing the solder wettability of the external electrodes.

It should be noted that, while the foregoing explained an example where a conductive paste with which to form a base for external electrode is applied on both end faces of the element body before sintering, the present invention is not limited to this mode. For example, it may be such that the element body is sintered, after which a conductive paste (such as Cu paste) for forming an external electrode is applied on both end faces of the element body and then baked in a nitrogen gas atmosphere.

The multilayer ceramic capacitor 10 in this embodiment can be manufactured through the aforementioned steps.

The multilayer ceramic capacitor 10 in this embodiment offers excellent DC bias properties and can ensure high reliability even when the dielectric layer thickness is reduced. Accordingly, the multilayer ceramic capacitor 10 in this embodiment can demonstrate excellent performance as a smoothing capacitor. The multilayer ceramic capacitor 10 in this embodiment can be favorably applied to a circuit (full-wave rectifier circuit) like the one shown in FIG. 5 as a smoothing capacitor to be mounted on a circuit board carrying the circuit.

EXAMPLES

More specific examples of the present invention are explained below. It should be noted that the present invention is not limited to these examples in any way.

Commercially available BaCO$_3$, CaCO$_3$, and TiO$_2$ were prepared. A dispersant was added to these prepared materials, after which they were mixed in deionized water together with zirconium balls. The mixed materials were dewatered and then calcined at 900 to 1000° C., to obtain perovskite powders (A to K) with a composition of (Ba$_{1-x1}$Ca$_{x1}$)$_{m1}$TiO$_3$. The x1, m1, average grain size, and condition after calcining, of each of the obtained perovskite powders are shown in Table 2 below.

TABLE 2

| | x1 | m1 | Average grain size (nm) | Condition after calcining |
|---|---|---|---|---|
| A | 0.02 | 1 | 165 | |
| B | 0.03 | 1 | 170 | |
| C | 0.05 | 1 | 180 | |
| D | 0.16 | 1 | 200 | |
| E | 0.18 | 1 | 200 | |
| F | 0.06 | 0.98 | 190 | There are many heterophase grains, and grain sizes vary significantly. |
| G | 0.06 | 0.99 | 175 | |
| H | 0.06 | 1.02 | 150 | |
| I | 0.06 | 1.03 | 140 | There are many heterophase grains, and grain sizes vary significantly. |
| J | 0.05 | 1 | 120 | |
| K | 0.05 | 1 | 250 | |

Among the obtained perovskite powders, powders F and I contained a lot of non-perovskite heterophase grains. Also, the grains varied significantly in size and were poorly synthesized. If these powders are used as a material for dielectric layers, desired properties and reliability may not be obtained. Accordingly, F and I were excluded and A to E, G, H, J, and K were used as primary powders. These primary powders had an m1 in a range of 0.99 to 1.02.

Materials were prepared by adding an R compound (R refers to one or more rare earth elements), an Mg compound, an Mn compound, an M compound (M refers to one or more elements selected from Ba, Ca, and Sr), a Zr compound, a V compound, and an Si compound, at the ratios shown in Tables 3 to 9 below, to the obtained perovskite powders (primary powders) of A to E, G, H, J, and K. The kinds and additive quantities of the Zr compound and M compound were adjusted as deemed appropriate so that the composition of the perovskite structure in the dielectric layer can satisfy (Ba$_{1-x-y}$Ca$_x$Sr$_y$)$_m$(Ti$_{1-z}$Zr$_z$)O$_3$, where $0.03 \leq x \leq 0.16$, $0 \leq y \leq 0.02$, $0 \leq z \leq 0.02$, $0.99 \leq m \leq 1.02$.

An organic solvent, a dispersant, a plasticizer, and an organic binder, were added to the prepared materials, followed by mixing together with zirconium balls, to prepare slurries.

The prepared slurries were applied on PET films to form green sheets of 3 μm in thickness. An Ni paste with which to form internal electrode layers was applied on the formed green sheets using the screen printing method.

Fifty green sheets on which the Ni paste had been applied were stacked and pressure-bonded. Thereafter, the stacked green sheets were cut to prescribed sizes to obtain laminate body chips. The obtained laminate body chips were degreased. Thereafter, the laminate body chips were sintered at a heating temperature of 1000° C. or higher for 30 to 300 seconds in an atmosphere of 10$^{-11}$ to 10$^{-8}$ atm in oxygen partial pressure. As a result, element bodies constituted by the dielectric layers and internal electrode layers formed as one piece, were obtained.

A Cu paste was applied on both end faces of the obtained element bodies and then baked in a nitrogen gas atmosphere. An Ni plating layer, and an Sn plating layer, were formed on the surface of the Cu external electrodes obtained by baking, to obtain multilayer ceramic capacitors. The obtained multilayer ceramic capacitors were of 1005 size and their dielectric layer thickness was 2 μm.

The obtained multilayer ceramic capacitors were tested for the items below.

[No-Load Dielectric Constant, Tan δ]

Under the conditions of 1 kHz, 1 Vrms, the multilayer ceramic capacitors were measured for capacitance using an LCR meter. The no-load dielectric constant was calculated from the measured capacitance, crossing area, layer thickness, and number of layers. Similarly, the multilayer ceramic capacitors were measured for tan δ using an LCR meter. A multilayer ceramic capacitor was determined as not meeting the prescribed performance (×) if its tan δ exceeded 5%.

[Rate of Change in Capacity]

Under the conditions of 1 kHz, 1 Vrms, the multilayer ceramic capacitors were measured for capacitance using an LCR meter. Using the capacitance at 0 DC bias as the reference, the rate of change (%) was calculated from the value of capacitance when a DC bias of 10 V was applied (at 5V/μm). A multilayer ceramic capacitor was determined as not meeting the prescribed performance (×) if its rate of change in capacity exceeded −40%.

[Temperature Characteristics]

The multilayer ceramic capacitors were placed in a thermostatic chamber and its temperature was changed from −55° C. to 125° C., for measurement of maximum rate of change in capacitance value ΔC (%) with reference to 25° C. A multilayer ceramic capacitor was determined as not meeting the prescribed performance (×) if its absolute value of ΔC exceeded 15%.

[HALT-MTTF]

HALT (highly accelerated limit test) was performed on the multilayer ceramic capacitors. To be specific, by using 30 multilayer ceramic capacitors per sample number, their mean time to failure (MTTF) was measured under the condition of continuous application of DC 100 V (50 V/μm) in an environment of 150° C. A multilayer ceramic capacitor sample was determined as not meeting the prescribed performance (×) if its MTTF was less than 5000 min.

Tables 3 to 9 below show the sample number (Nos. 1 to 110), kind of primary powder (A to E, G, H, J, K), x, m, kind of R added to the primary powder, ratio of each R (ratio by mol in equivalent element relative to 100 mol of primary powder), total R quantity added to the primary powder (ratio by mol in equivalent element relative to 100 mol of primary powder), average ionic radius (Å) of R, ratio of each element added to the primary powder (ratio by mol in equivalent element relative to 100 mol of primary powder), and ratio by mol of the total of Ba, Sr, and Ca to the total of Ti and Zr as contained in the materials.

Tables 10 to 16 below show the no-load dielectric constant, tan δ, rate of change in capacity, temperature characteristics and HALT-MTTF result of each of the multilayer ceramic capacitors. The sample numbers in Tables 10 to 16 correspond to the sample numbers in Tables 3 to 9.

TABLE 3

| Sample No. | Primary powder | x | m | Gd | Tb | Dy | Ho | Er | Tm | Yb | Lu | Y | Total quantity | Average ionic radius of R | Mg | Mn | V | Si | Zr | (Ba + Sr + Ca)/(Ti + Zr) |
|---|---|---|---|---|---|---|---|---|---|---|---|---|---|---|---|---|---|---|---|---|
| 1 | A | 0.02 | 1 | 0.5 | | 0.5 | | | | 0.5 | | | 1.5 | 0.906 | 0.65 | 0.3 | 0.1 | 1 | 0.2 | 1.008 |
| 2 | B | 0.03 | 1 | 0.5 | | 0.5 | | | | 0.5 | | | 1.5 | 0.906 | 0.65 | 0.3 | 0.1 | 1 | 0.2 | 1.008 |
| 3 | C | 0.05 | 1 | 0.5 | | 0.5 | | | | 0.5 | | | 1.5 | 0.906 | 0.65 | 0.3 | 0.1 | 1 | 0.2 | 1.008 |
| 4 | D | 0.16 | 1 | 0.5 | | 0.5 | | | | 0.5 | | | 1.5 | 0.906 | 0.65 | 0.3 | 0.1 | 1 | 0.2 | 1.008 |
| 5 | E | 0.18 | 1 | 0.5 | | 0.5 | | | | 0.5 | | | 1.5 | 0.906 | 0.65 | 0.3 | 0.1 | 1 | 0.2 | 1.008 |
| 6 | G | 0.06 | 0.99 | 0.5 | | 0.5 | | | | 0.5 | | | 1.5 | 0.906 | 0.65 | 0.3 | 0.1 | 1 | 0.2 | 1.008 |
| 7 | H | 0.06 | 1.02 | 0.5 | | 0.5 | | | | 0.5 | | | 1.5 | 0.906 | 0.65 | 0.3 | 0.1 | 1 | 1.2 | 1.008 |
| 8 | J | 0.05 | 1 | 0.5 | | 0.5 | | | | 0.5 | | | 1.5 | 0.906 | 0.65 | 0.3 | 0.1 | 1 | 0.2 | 1.008 |
| 9 | K | 0.05 | 1 | 0.5 | | 0.5 | | | | 0.5 | | | 1.5 | 0.906 | 0.65 | 0.3 | 0.1 | 1 | 0.2 | 1.008 |
| 10 | C | 0.05 | 1 | 2 | | | | | | | | | 2 | 0.938 | 0.8 | 0.3 | 0.1 | 1 | 0.2 | 1.008 |
| 11 | C | 0.05 | 1 | | 2 | | | | | | | | 2 | 0.923 | 0.8 | 0.3 | 0.1 | 1 | 0.2 | 1.008 |
| 12 | C | 0.05 | 1 | | | 2 | | | | | | | 2 | 0.912 | 0.8 | 0.3 | 0.1 | 1 | 0.2 | 1.008 |
| 13 | C | 0.05 | 1 | | | | 2 | | | | | | 2 | 0.901 | 0.8 | 0.3 | 0.1 | 1 | 0.2 | 1.008 |
| 14 | C | 0.05 | 1 | | | | | 2 | | | | | 2 | 0.890 | 0.8 | 0.3 | 0.1 | 1 | 0.2 | 1.008 |
| 15 | C | 0.05 | 1 | | | | | | 2 | | | | 2 | 0.880 | 0.8 | 0.3 | 0.1 | 1 | 0.2 | 1.008 |
| 16 | C | 0.05 | 1 | | | | | | | 2 | | | 2 | 0.868 | 0.8 | 0.3 | 0.1 | 1 | 0.2 | 1.008 |

TABLE 4

| Sample No. | Primary powder | x | m | Gd | Tb | Dy | Ho | Er | Tm | Yb | Lu | Y | Total quantity | Average ionic radius of R | Mg | Mn | V | Si | Zr | (Ba + Sr + Ca)/(Ti + Zr) |
|---|---|---|---|---|---|---|---|---|---|---|---|---|---|---|---|---|---|---|---|---|
| 17 | C | 0.05 | 1 | | | | | | | | 2 | | 2 | 0.861 | 0.8 | 0.3 | 0.1 | 1 | 0.2 | 1.008 |
| 18 | C | 0.05 | 1 | | | | | | | | | 2 | 2 | 0.900 | 0.8 | 0.3 | 0.1 | 1 | 0.2 | 1.008 |
| 19 | C | 0.05 | 1 | 1 | | | | 1 | | | | | 2 | 0.920 | 0.8 | 0.3 | 0.1 | 1 | 0.2 | 1.008 |
| 20 | C | 0.05 | 1 | 1 | | | | | 1 | | | | 2 | 0.914 | 0.8 | 0.3 | 0.1 | 1 | 0.2 | 1.008 |
| 21 | C | 0.05 | 1 | 1 | | | | | | 1 | | | 2 | 0.903 | 0.8 | 0.3 | 0.1 | 1 | 0.2 | 1.008 |
| 22 | C | 0.05 | 1 | | 1 | | | | | 1 | | | 2 | 0.896 | 0.8 | 0.3 | 0.1 | 1 | 0.2 | 1.008 |
| 23 | C | 0.05 | 1 | | 1 | | | | | | 1 | | 2 | 0.892 | 0.8 | 0.3 | 0.1 | 1 | 0.2 | 1.008 |
| 24 | C | 0.05 | 1 | | | 1 | | | | | 1 | | 2 | 0.887 | 0.8 | 0.3 | 0.1 | 1 | 0.2 | 1.008 |
| 25 | C | 0.05 | 1 | | | | | 1 | | | | 1 | 2 | 0.895 | 0.8 | 0.3 | 0.1 | 1 | 0.2 | 1.008 |
| 26 | C | 0.05 | 1 | 0.3 | | 0.3 | | 0.3 | | | | | 0.9 | 0.913 | 0.8 | 0.3 | 0.1 | 1 | 0.2 | 1.008 |
| 27 | C | 0.05 | 1 | 0.33 | | 0.34 | | 0.33 | | | | | 1 | 0.913 | 0.8 | 0.3 | 0.1 | 1 | 0.2 | 1.008 |
| 28 | C | 0.05 | 1 | 1.3 | | 1.3 | | 1.3 | | | | | 3.9 | 0.913 | 0.8 | 0.3 | 0.1 | 1 | 0.2 | 1.008 |
| 29 | C | 0.05 | 1 | 1.4 | | 1.4 | | 1.4 | | | | | 4.2 | 0.913 | 0.8 | 0.3 | 0.1 | 1 | 0.2 | 1.008 |
| 30 | C | 0.05 | 1 | 0.5 | | 0.5 | | | | 0.5 | | | 1.5 | 0.906 | 0.1 | 0.2 | 0.15 | 2.5 | 1 | 1.002 |
| 31 | C | 0.05 | 1 | 0.5 | | 0.5 | | | | 0.5 | | | 1.5 | 0.906 | 0.2 | 0.5 | 0.18 | 1.8 | 0.5 | 1.005 |
| 32 | C | 0.05 | 1 | 0.5 | | 0.5 | | | | 0.5 | | | 1.5 | 0.906 | 1.8 | 0.3 | 0.1 | 1 | 0.2 | 1.008 |

TABLE 5

| Sample No. | Primary powder | x | m | Gd | Tb | Dy | Ho | Er | Tm | Yb | Lu | Y | Total quantity | Average ionic radius of R | Mg | Mn | V | Si | Zr | (Ba + Sr + Ca)/(Ti + Zr) |
|---|---|---|---|---|---|---|---|---|---|---|---|---|---|---|---|---|---|---|---|---|
| 33 | C | 0.05 | 1 | 0.5 | | 0.5 | | | | 0.5 | | | 1.5 | 0.906 | 2.5 | 0.3 | 0.15 | 1.5 | 1.8 | 1.002 |
| 34 | C | 0.05 | 1 | 0.5 | | 0.5 | | | | 0.5 | | | 1.5 | 0.906 | 2.7 | 0.3 | 0.1 | 2 | 1 | 1.003 |
| 35 | C | 0.05 | 1 | 0.5 | | 0.5 | | | | 0.5 | | | 1.5 | 0.906 | 0.8 | 0.08 | 0.1 | 2 | 0.3 | 1.002 |
| 36 | C | 0.05 | 1 | 0.5 | | 0.5 | | | | 0.5 | | | 1.5 | 0.906 | 0.65 | 0.1 | 0.2 | 1.5 | 0.5 | 1.015 |
| 37 | C | 0.05 | 1 | 0.5 | | 0.5 | | | | 0.5 | | | 1.5 | 0.906 | 0.5 | 1 | 0.05 | 1 | 0.8 | 1.002 |
| 38 | C | 0.05 | 1 | 0.5 | | 0.5 | | | | 0.5 | | | 1.5 | 0.906 | 0.65 | 1.1 | 0.1 | 1 | 0.2 | 1.008 |
| 39 | C | 0.05 | 1 | 0.5 | | 0.5 | | | | 0.5 | | | 1.5 | 0.906 | 0.85 | 0.45 | 0.3 | 1.5 | 1 | 1.000 |
| 40 | C | 0.05 | 1 | 0.5 | | 0.5 | | | | 0.5 | | | 1.5 | 0.906 | 0.65 | 0.3 | 0.35 | 1 | 0.2 | 1.008 |
| 41 | C | 0.05 | 1 | 0.5 | | 0.5 | | | | 0.5 | | | 1.5 | 0.906 | 0.85 | 0.3 | 0.05 | 0.05 | 0.2 | 1.008 |
| 42 | C | 0.05 | 1 | 0.5 | | 0.5 | | | | 0.5 | | | 1.5 | 0.906 | 0.4 | 0.3 | 0.1 | 0.2 | 0.2 | 1.008 |
| 43 | C | 0.05 | 1 | 0.5 | | 0.5 | | | | 0.5 | | | 1.5 | 0.906 | 0.35 | 0.3 | 0.13 | 5 | 0.1 | 1.024 |
| 44 | C | 0.05 | 1 | 0.5 | | 0.5 | | | | 0.5 | | | 1.5 | 0.906 | 0.65 | 0.3 | 0.18 | 6 | 0.2 | 1.008 |
| 45 | C | 0.05 | 1 | 0.5 | | 0.5 | | | | 0.5 | | | 1.5 | 0.906 | 0.8 | 0.25 | 0.2 | 1 | 1.5 | 1.015 |
| 46 | G | 0.06 | 0.99 | 0.5 | | 0.5 | | | | 0.5 | | | 1.5 | 0.906 | 0.8 | 0.45 | 0.2 | 2 | 1 | 1.030 |
| 47 | G | 0.06 | 0.99 | 0.5 | | 0.5 | | | | 0.5 | | | 1.5 | 0.906 | 2 | 0.5 | 0.18 | 1.3 | 2 | 1.029 |
| 48 | G | 0.06 | 0.99 | 0.5 | | 0.5 | | | | 0.5 | | | 1.5 | 0.906 | 0.65 | 0.25 | 0.13 | 1.7 | 1.5 | 1.005 |

TABLE 6

| Sample No. | Primary powder | x | m | Gd | Tb | Dy | Ho | Er | Tm | Yb | Lu | Y | Total quantity | Average ionic radius of R | Mg | Mn | V | Si | Zr | (Ba + Sr + Ca)/(Ti + Zr) |
|---|---|---|---|---|---|---|---|---|---|---|---|---|---|---|---|---|---|---|---|---|
| 49 | G | 0.06 | 0.99 | 0.5 | 0.5 |  |  | 0.5 |  |  |  |  | 1.5 | 0.906 | 0.65 | 0.28 | 0.08 | 2 | 3 | 1.005 |
| 50 | G | 0.06 | 0.99 | 0.5 | 0.5 |  |  | 0.5 |  |  |  |  | 1.5 | 0.906 | 0.65 | 0.32 | 0.09 | 2 | 0.1 | 0.998 |
| 51 | G | 0.06 | 0.99 | 0.5 | 0.5 |  |  | 0.5 |  |  |  |  | 1.5 | 0.906 | 0.65 | 0.4 | 0.11 | 1 | 0.5 | 1.035 |
| 52 | H | 0.06 | 1.02 | 0.8 | 0.4 |  |  | 0.6 |  |  |  |  | 1.8 | 0.909 | 0.65 | 0.85 | 0.05 | 4.5 | 1.9 | 1.011 |
| 53 | C | 0.05 | 1 | 0.5 | 0.5 |  |  | 0.5 |  |  |  |  | 1.5 | 0.906 | 1.8 | 0.3 | 0.1 | 1 | 0.2 | 1.008 |
| 54 | C | 0.05 | 1 | 0.5 | 0.5 |  |  | 0.5 |  |  |  |  | 1.5 | 0.906 | 1.8 | 0.3 | 0.1 | 1 | 0.2 | 1.008 |
| 55 | C | 0.05 | 1 |  |  | 1.8 |  |  |  |  |  |  | 1.8 | 0.912 | 0.2 | 0.5 | 0.18 | 1.8 | 0.5 | 1.005 |
| 56 | C | 0.05 | 1 |  |  | 1.8 |  |  |  |  |  |  | 1.8 | 0.912 | 1.8 | 0.3 | 0.1 | 1 | 0.2 | 1.008 |
| 57 | C | 0.05 | 1 |  |  | 1.8 |  |  |  |  |  |  | 1.8 | 0.912 | 2.5 | 0.3 | 0.15 | 1.5 | 1.8 | 1.002 |
| 58 | C | 0.05 | 1 |  |  | 1.8 |  |  |  |  |  |  | 1.8 | 0.912 | 0.65 | 0.1 | 0.2 | 1.5 | 0.5 | 1.015 |
| 59 | C | 0.05 | 1 |  |  | 1.8 |  |  |  |  |  |  | 1.8 | 0.912 | 0.5 | 1 | 0.05 | 1 | 0.8 | 1.002 |
| 60 | C | 0.05 | 1 |  |  | 1.8 |  |  |  |  |  |  | 1.8 | 0.912 | 0.85 | 0.45 | 0.3 | 1.5 | 1 | 1.000 |
| 61 | C | 0.05 | 1 |  |  | 1.8 |  |  |  |  |  |  | 1.8 | 0.912 | 0.4 | 0.3 | 0.1 | 0.2 | 0.2 | 1.008 |
| 62 | C | 0.05 | 1 |  |  | 1.8 |  |  |  |  |  |  | 1.8 | 0.912 | 0.35 | 0.3 | 0.13 | 5 | 0.1 | 1.024 |
| 63 | C | 0.05 | 1 |  |  | 1.8 |  |  |  |  |  |  | 1.8 | 0.912 | 1.8 | 0.3 | 0.1 | 1 | 0.2 | 1.008 |
| 64 | C | 0.05 | 1 |  |  | 1.8 |  |  |  |  |  |  | 1.8 | 0.912 | 1.8 | 0.3 | 0.1 | 1 | 0.2 | 1.008 |

TABLE 7

| Sample No. | Primary powder | x | m | Gd | Tb | Dy | Ho | Er | Tm | Yb | Lu | Y | Total quantity | Average ionic radius of R | Mg | Mn | V | Si | Zr | (Ba + Sr + Ca)/(Ti + Zr) |
|---|---|---|---|---|---|---|---|---|---|---|---|---|---|---|---|---|---|---|---|---|
| 65 | C | 0.05 | 1 | 0.9 |  |  |  | 0.9 |  |  |  |  | 1.8 | 0.914 | 0.2 | 0.5 | 0.18 | 1.8 | 0.5 | 1.005 |
| 66 | C | 0.05 | 1 | 0.9 |  |  |  | 0.9 |  |  |  |  | 1.8 | 0.914 | 1.8 | 0.3 | 0.1 | 1 | 0.2 | 1.008 |
| 67 | C | 0.05 | 1 | 0.9 |  |  |  | 0.9 |  |  |  |  | 1.8 | 0.914 | 2.5 | 0.3 | 0.15 | 1.5 | 1.8 | 1.002 |
| 68 | C | 0.05 | 1 | 0.9 |  |  |  | 0.9 |  |  |  |  | 1.8 | 0.914 | 0.65 | 0.1 | 0.2 | 1.5 | 0.5 | 1.015 |
| 69 | C | 0.05 | 1 | 0.9 |  |  |  | 0.9 |  |  |  |  | 1.8 | 0.914 | 0.5 | 1 | 0.05 | 1 | 0.8 | 1.002 |
| 70 | C | 0.05 | 1 | 0.9 |  |  |  | 0.9 |  |  |  |  | 1.8 | 0.914 | 0.85 | 0.45 | 0.3 | 1.5 | 1 | 1.000 |
| 71 | C | 0.05 | 1 | 0.9 |  |  |  | 0.9 |  |  |  |  | 1.8 | 0.914 | 0.4 | 0.3 | 0.1 | 0.2 | 0.2 | 1.008 |
| 72 | C | 0.05 | 1 | 0.9 |  |  |  | 0.9 |  |  |  |  | 1.8 | 0.914 | 0.35 | 0.3 | 0.13 | 5 | 0.1 | 1.024 |
| 73 | C | 0.05 | 1 | 0.9 |  |  |  | 0.9 |  |  |  |  | 1.8 | 0.914 | 1.8 | 0.3 | 0.1 | 1 | 0.2 | 1.008 |
| 74 | C | 0.05 | 1 | 0.9 |  |  |  | 0.9 |  |  |  |  | 1.8 | 0.914 | 1.8 | 0.3 | 0.1 | 1 | 0.2 | 1.008 |
| 75 | C | 0.05 | 1 | 0.9 |  |  |  |  |  | 0.9 |  |  | 1.8 | 0.903 | 0.2 | 0.5 | 0.18 | 1.8 | 0.5 | 1.005 |
| 76 | C | 0.05 | 1 | 0.9 |  |  |  |  |  | 0.9 |  |  | 1.8 | 0.903 | 1.8 | 0.3 | 0.1 | 1 | 0.2 | 1.008 |
| 77 | C | 0.05 | 1 | 0.9 |  |  |  |  |  | 0.9 |  |  | 1.8 | 0.903 | 2.5 | 0.3 | 0.15 | 1.5 | 1.8 | 1.002 |
| 78 | C | 0.05 | 1 | 0.9 |  |  |  |  |  | 0.9 |  |  | 1.8 | 0.903 | 0.65 | 0.1 | 0.2 | 1.5 | 0.5 | 1.015 |
| 79 | C | 0.05 | 1 | 0.9 |  |  |  |  |  | 0.9 |  |  | 1.8 | 0.903 | 0.5 | 1 | 0.05 | 1 | 0.8 | 1.002 |
| 80 | C | 0.05 | 1 | 0.9 |  |  |  |  |  | 0.9 |  |  | 1.8 | 0.903 | 0.85 | 0.45 | 0.3 | 1.5 | 1 | 1.000 |

TABLE 8

| Sample No. | Primary powder | x | m | Gd | Tb | Dy | Ho | Er | Tm | Yb | Lu | Y | Total quantity | Average ionic radius of R | Mg | Mn | V | Si | Zr | (Ba + Sr + Ca)/(Ti + Zr) |
|---|---|---|---|---|---|---|---|---|---|---|---|---|---|---|---|---|---|---|---|---|
| 81 | C | 0.05 | 1 | 0.9 |  |  |  |  |  | 0.9 |  |  | 1.8 | 0.903 | 0.4 | 0.3 | 0.1 | 0.2 | 0.2 | 1.008 |
| 82 | C | 0.05 | 1 | 0.9 |  |  |  |  |  | 0.9 |  |  | 1.8 | 0.903 | 0.35 | 0.3 | 0.13 | 5 | 0.1 | 1.024 |
| 83 | C | 0.05 | 1 | 0.9 |  |  |  |  |  | 0.9 |  |  | 1.8 | 0.903 | 1.8 | 0.3 | 0.1 | 1 | 0.2 | 1.008 |
| 84 | C | 0.05 | 1 | 0.9 |  |  |  |  |  | 0.9 |  |  | 1.8 | 0.903 | 1.8 | 0.3 | 0.1 | 1 | 0.2 | 1.008 |
| 85 | C | 0.05 | 1 |  | 0.9 |  |  |  |  | 0.9 |  |  | 1.8 | 0.896 | 0.2 | 0.5 | 0.18 | 1.8 | 0.5 | 1.005 |
| 86 | C | 0.05 | 1 |  | 0.9 |  |  |  |  | 0.9 |  |  | 1.8 | 0.896 | 1.8 | 0.3 | 0.1 | 1 | 0.2 | 1.008 |
| 87 | C | 0.05 | 1 |  | 0.9 |  |  |  |  | 0.9 |  |  | 1.8 | 0.896 | 2.5 | 0.3 | 0.15 | 1.5 | 1.8 | 1.002 |
| 88 | C | 0.05 | 1 |  | 0.9 |  |  |  |  | 0.9 |  |  | 1.8 | 0.896 | 0.65 | 0.1 | 0.2 | 1.5 | 0.5 | 1.015 |
| 89 | C | 0.05 | 1 |  | 0.9 |  |  |  |  | 0.9 |  |  | 1.8 | 0.896 | 0.5 | 1 | 0.05 | 1 | 0.8 | 1.002 |
| 90 | C | 0.05 | 1 |  | 0.9 |  |  |  |  | 0.9 |  |  | 1.8 | 0.896 | 0.85 | 0.45 | 0.3 | 1.5 | 1 | 1.000 |
| 91 | C | 0.05 | 1 |  | 0.9 |  |  |  |  | 0.9 |  |  | 1.8 | 0.896 | 0.4 | 0.3 | 0.1 | 0.2 | 0.2 | 1.008 |
| 92 | C | 0.05 | 1 |  | 0.9 |  |  |  |  | 0.9 |  |  | 1.8 | 0.896 | 0.35 | 0.3 | 0.13 | 5 | 0.1 | 1.024 |
| 93 | C | 0.05 | 1 |  | 0.9 |  |  |  |  | 0.9 |  |  | 1.8 | 0.896 | 1.8 | 0.3 | 0.1 | 1 | 0.2 | 1.008 |
| 94 | C | 0.05 | 1 |  | 0.9 |  |  |  |  | 0.9 |  |  | 1.8 | 0.896 | 1.8 | 0.3 | 0.1 | 1 | 0.2 | 1.008 |
| 95 | C | 0.05 | 1 |  |  |  | 0.9 |  |  |  | 0.9 |  | 1.8 | 0.895 | 0.2 | 0.5 | 0.18 | 1.8 | 0.5 | 1.005 |
| 96 | C | 0.05 | 1 |  |  |  | 0.9 |  |  |  | 0.9 |  | 1.8 | 0.895 | 1.8 | 0.3 | 0.1 | 1 | 0.2 | 1.008 |

TABLE 9

| Sample No. | Primary powder | x | m | Gd | Tb | Dy | Ho | Er | Tm | Yb | Lu | Y | Total quantity | Average ionic radius of R | Mg | Mn | V | Si | Zr | (Ba + Sr + Ca)/(Ti + Zr) |
|---|---|---|---|---|---|---|---|---|---|---|---|---|---|---|---|---|---|---|---|---|
| 97 | C | 0.05 | 1 | | | | 0.9 | | | | | 0.9 | 1.8 | 0.895 | 2.5 | 0.3 | 0.15 | 1.5 | 1.8 | 1.002 |
| 98 | C | 0.05 | 1 | | | | 0.9 | | | | | 0.9 | 1.8 | 0.895 | 0.65 | 0.1 | 0.2 | 1.5 | 0.5 | 1.015 |
| 99 | C | 0.05 | 1 | | | | 0.9 | | | | | 0.9 | 1.8 | 0.895 | 0.5 | 1 | 0.05 | 1 | 0.8 | 1.002 |
| 100 | C | 0.05 | 1 | | | | 0.9 | | | | | 0.9 | 1.8 | 0.895 | 0.85 | 0.45 | 0.3 | 1.5 | 1 | 1.000 |
| 101 | C | 0.05 | 1 | | | | 0.9 | | | | | 0.9 | 1.8 | 0.895 | 0.4 | 0.3 | 0.1 | 0.2 | 0.2 | 1.008 |
| 102 | C | 0.05 | 1 | | | | 0.9 | | | | | 0.9 | 1.8 | 0.895 | 0.35 | 0.3 | 0.13 | 5 | 0.1 | 1.024 |
| 103 | C | 0.05 | 1 | | | | 0.9 | | | | | 0.9 | 1.8 | 0.895 | 1.8 | 0.3 | 0.1 | 1 | 0.2 | 1.008 |
| 104 | C | 0.05 | 1 | | | | 0.9 | | | | | 0.9 | 1.8 | 0.895 | 1.8 | 0.3 | 0.1 | 1 | 0.2 | 1.008 |
| 105 | C | 0.05 | 1 | 0.8 | | | | | | 1.2 | | | 2 | 0.896 | 1.8 | 0.3 | 0.1 | 1 | 0.2 | 1.008 |
| 106 | C | 0.05 | 1 | 0.9 | | | | | | 1.1 | | | 2 | 0.900 | 1.8 | 0.3 | 0.1 | 1 | 0.2 | 1.008 |
| 107 | C | 0.05 | 1 | 1 | | | | | | 1 | | | 2 | 0.903 | 1.8 | 0.3 | 0.1 | 1 | 0.2 | 1.008 |
| 108 | C | 0.05 | 1 | 1.1 | | | | | | 0.9 | | | 2 | 0.907 | 1.8 | 0.3 | 0.1 | 1 | 0.2 | 1.008 |
| 109 | C | 0.05 | 1 | 1.2 | | | | | | 0.8 | | | 2 | 0.910 | 1.8 | 0.3 | 0.1 | 1 | 0.2 | 1.008 |
| 110 | C | 0.05 | 1 | 1.3 | | | | | | 0.7 | | | 2 | 0.914 | 1.8 | 0.3 | 0.1 | 1 | 0.2 | 1.008 |

TABLE 10

| Sample No. | No-load dielectric constant | tanδ (%) | Rate of change in bias capacity (at 5 V/μm) | Temperature characteristics ΔC (%) | HALT-MTTF (min) | Evaluation |
|---|---|---|---|---|---|---|
| 1 | 3200 | 1.5 | −52 | 18 | 3500 | X |
| 2 | 2300 | 2.6 | −37 | 12 | 5000 | ○ |
| 3 | 2140 | 2.3 | −35 | 11 | 8300 | ○ |
| 4 | 1830 | 3.3 | −29 | 10 | 7500 | ○ |
| 5 | 1730 | 4.5 | −28 | 9 | 3250 | X |
| 6 | 2100 | 2.1 | 34 | 11 | 7200 | ○ |
| 7 | 2050 | 2.1 | −33 | 11 | 8100 | ○ |
| 8 | 3800 | 6.1 | −62 | 56 | 2800 | X |
| 9 | Not evaluated. (Sintering at or below 1250° C. was difficult.) | | | | | X |
| 10 | 4200 | 8.7 | −70 | −21 | 5100 | X |
| 11 | 3850 | 6 | −64 | −19 | 5340 | X |
| 12 | 2500 | 3.1 | −40 | −14.5 | 8300 | ○ |
| 13 | 2200 | 2.8 | −35 | 12 | 6500 | ○ |
| 14 | 2050 | 2.1 | −33 | 11 | 2100 | X |
| 15 | 1990 | 2.1 | −32 | 10 | 1560 | X |
| 16 | 1980 | 1.9 | −32 | 10 | 1030 | X |

TABLE 11

| Sample No. | No-load dielectric constant | tanδ (%) | Rate of change in bias capacity (at 5 V/μm) | Temperature characteristics ΔC (%) | HALT-MTTF (min) | Evaluation |
|---|---|---|---|---|---|---|
| 17 | 1980 | 2 | −32 | 10 | 980 | X |
| 18 | 2130 | 3.3 | −34 | 12 | 5500 | ○ |
| 19 | 3100 | 5.1 | −51 | 16 | 4500 | X |
| 20 | 2350 | 3.1 | −38 | 12 | 5600 | ○ |
| 21 | 2300 | 3 | −37 | 12 | 5500 | ○ |
| 22 | 2250 | 3 | −36 | 12 | 5700 | ○ |
| 23 | 2000 | 2.8 | −32 | 10 | 2300 | X |
| 24 | 2030 | 2.3 | −33 | 9 | 780 | X |
| 25 | 2060 | 3.5 | −33 | 13 | 5430 | ○ |
| 26 | 2450 | 4.5 | −34 | 16 | 3500 | X |
| 27 | 2500 | 4.5 | −40 | 15 | 5000 | ○ |
| 28 | 1800 | 4.7 | −29 | 12 | 9800 | ○ |
| 29 | Not evaluated. (Sintering at or below 1250° C. was difficult.) | | | | | X |
| 30 | 4300 | 10 | −71 | 32 | 300 | X |
| 31 | 2500 | 5 | −40 | 15 | 5000 | ○ |
| 32 | 2300 | 3.3 | −35 | 13 | 5300 | ○ |

TABLE 12

| Sample No. | No-load dielectric constant | tanδ (%) | Rate of change in bias capacity (at 5 V/μm) | Temperature characteristics ΔC (%) | HALT-MTTF (min) | Evaluation |
|---|---|---|---|---|---|---|
| 33 | 2150 | 3.3 | −34 | 12 | 6000 | ○ |
| 34 | Not evaluated. (Sintering at or below 1250° C. was difficult.) | | | | | X |
| 35 | 3200 | 4.5 | −52 | 18 | 1100 | X |
| 36 | 2500 | 3.5 | −40 | 14 | 5300 | ○ |
| 37 | 2000 | 2.5 | −32 | 11 | 5000 | ○ |
| 38 | 1900 | 2.3 | −32 | 10 | 4500 | X |
| 39 | 2130 | 2.5 | −34 | 13 | 5200 | ○ |
| 40 | 2200 | 3.3 | −36 | 13 | 3400 | X |
| 41 | Not evaluated. (Sintering at or below 1250° C. was difficult.) | | | | | X |
| 42 | 2300 | 3.4 | −37 | 15 | 5100 | ○ |
| 43 | 2500 | 5 | −40 | 15 | 5600 | ○ |
| 44 | 2450 | 5.1 | −40 | 16 | 2300 | X |
| 45 | 2350 | 4 | −37 | 14 | 6700 | ○ |
| 46 | 2200 | 3.8 | −36 | 14 | 7800 | ○ |
| 47 | Not evaluated. (Sintering at or below 1250° C. was difficult.) | | | | | X |
| 48 | 2400 | 3.6 | −39 | 14 | 8700 | ○ |

TABLE 13

| Sample No. | No-load dielectric constant | tanδ (%) | Rate of change in bias capacity (at 5 V/μm) | Temperature characteristics ΔC (%) | HALT-MTTF (min) | Evaluation |
|---|---|---|---|---|---|---|
| 49 | 2000 | 3.3 | −32 | 17 | 5100 | X |
| 50 | 4800 | 12 | −80 | 48 | 1500 | X |
| 51 | Not evaluated. (Sintering at or below 1250° C. was difficult.) | | | | | X |
| 52 | 2400 | 4.3 | −36 | 13 | 5100 | ○ |
| 53 | 2300 | 3.5 | −33 | 14 | 5100 | ○ |
| 54 | 2300 | 3.1 | −36 | 14 | 5200 | ○ |
| 55 | 2400 | 4.8 | −39 | 15 | 5100 | ○ |
| 56 | 2300 | 3.5 | −35 | 14 | 5200 | ○ |
| 57 | 2200 | 3.3 | −35 | 12 | 5800 | ○ |
| 58 | 2350 | 3.6 | −37 | 13 | 5500 | ○ |
| 59 | 2100 | 2.6 | −32 | 11 | 5100 | ○ |
| 60 | 2150 | 2.5 | −33 | 13 | 5200 | ○ |
| 61 | 2300 | 3.3 | −38 | 14 | 5100 | ○ |
| 62 | 2450 | 5 | −38 | 15 | 5500 | ○ |
| 63 | 2300 | 3.5 | −32 | 14 | 5200 | ○ |
| 64 | 2300 | 3.3 | −34 | 13 | 5300 | ○ |

TABLE 14

| Sample No. | No-load dielectric constant | tanδ (%) | Rate of change in bias capacity (at 5 V/μm) | Temperature characteristics ΔC (%) | HALT-MTTF (min) | Evaluation |
|---|---|---|---|---|---|---|
| 65 | 2450 | 4.7 | −37 | 14 | 5100 | ○ |
| 66 | 2300 | 3.5 | −35 | 14 | 5200 | ○ |
| 67 | 2200 | 3.5 | −33 | 12 | 5300 | ○ |
| 68 | 2400 | 3.4 | −37 | 13 | 5300 | ○ |
| 69 | 2100 | 2.9 | −33 | 12 | 5100 | ○ |
| 70 | 2100 | 2.6 | −37 | 13 | 5300 | ○ |
| 71 | 2300 | 3.3 | −35 | 15 | 5100 | ○ |
| 72 | 2450 | 4.7 | −36 | 14 | 5600 | ○ |
| 73 | 2300 | 3.5 | −31 | 14 | 5100 | ○ |
| 74 | 2300 | 3.3 | −33 | 14 | 5200 | ○ |
| 75 | 2400 | 5 | −38 | 14 | 5000 | ○ |
| 76 | 2300 | 3.5 | −36 | 14 | 5400 | ○ |
| 77 | 2200 | 3.6 | −34 | 13 | 5900 | ○ |
| 78 | 2400 | 3.6 | −39 | 14 | 5300 | ○ |
| 79 | 2100 | 3.1 | −32 | 12 | 5000 | ○ |
| 80 | 2200 | 3.2 | −35 | 13 | 5400 | ○ |

TABLE 15

| Sample No. | No-load dielectric constant | tanδ (%) | Rate of change in bias capacity (at 5 V/μm) | Temperature characteristics ΔC (%) | HALT-MTTF (min) | Evaluation |
|---|---|---|---|---|---|---|
| 81 | 2200 | 3.4 | −35 | 14 | 5200 | ○ |
| 82 | 2450 | 4.6 | −37 | 15 | 5300 | ○ |
| 83 | 2300 | 3.3 | −35 | 14 | 5300 | ○ |
| 84 | 2300 | 3.3 | −34 | 14 | 5300 | ○ |
| 85 | 2400 | 4.8 | −38 | 15 | 5100 | ○ |
| 86 | 2300 | 3.7 | −35 | 13 | 5200 | ○ |
| 87 | 2200 | 3.3 | −33 | 13 | 5800 | ○ |
| 88 | 2350 | 3.2 | −35 | 13 | 5300 | ○ |
| 89 | 2100 | 3.2 | −32 | 12 | 5100 | ○ |
| 90 | 2100 | 2.9 | −36 | 14 | 5200 | ○ |
| 91 | 2300 | 3.4 | −37 | 15 | 5200 | ○ |
| 92 | 2450 | 4.5 | −36 | 14 | 5400 | ○ |
| 93 | 2300 | 3.5 | −33 | 14 | 5200 | ○ |
| 94 | 2300 | 3.5 | −33 | 13 | 5300 | ○ |
| 95 | 2450 | 4.8 | −36 | 14 | 5000 | ○ |
| 96 | 2300 | 3.4 | −35 | 14 | 5200 | ○ |

TABLE 16

| Sample No. | No-load dielectric constant | tanδ (%) | Rate of change in bias capacity (at 5 V/μm) | Temperature characteristics ΔC (%) | HALT-MTTF (min) | Evaluation |
|---|---|---|---|---|---|---|
| 97 | 2200 | 3 | −36 | 12 | 5700 | ○ |
| 98 | 2300 | 3.1 | −37 | 13 | 5500 | ○ |
| 99 | 2100 | 3.1 | −31 | 12 | 5100 | ○ |
| 100 | 2100 | 2.8 | −33 | 13 | 5100 | ○ |
| 101 | 2300 | 3.4 | −37 | 14 | 5100 | ○ |
| 102 | 2450 | 4.7 | −37 | 15 | 5300 | ○ |
| 103 | 2300 | 3.7 | −32 | 14 | 5200 | ○ |
| 104 | 2300 | 3.5 | −35 | 14 | 5300 | ○ |
| 105 | 2250 | 3.7 | −32 | 13 | 5200 | ○ |
| 106 | 2300 | 3.2 | −34 | 14 | 5300 | ○ |
| 107 | 2250 | 3 | −32 | 13 | 5200 | ○ |
| 108 | 2300 | 3.4 | −36 | 13 | 5300 | ○ |
| 109 | 2300 | 3.5 | −33 | 13 | 5400 | ○ |
| 110 | 2300 | 3.4 | −32 | 13 | 5300 | ○ |

Sample No. 1 had a rate of change in bias capacity exceeding −40%. Also, its absolute value of ΔC exceeded 15%, and its temperature characteristics did not meet the EIA-specified X7R standard. Furthermore, its HALT-MTTF was less than 5000 min. Accordingly, the multilayer ceramic capacitor under Sample No. 1 was determined as not meeting the prescribed performance (x).

Sample No. 5 had a HALT-MTTF of less than 5000 min. Accordingly, the multilayer ceramic capacitor under Sample No. 5 was determined as not meeting the prescribed performance (x).

Sample No. 8 produced grain growth in the dielectric layers. Also, its rate of change in bias capacity exceeded −40%. Additionally, its absolute value of ΔC exceeded 15%, and its temperature characteristics did not meet the EIA-specified X7R standard. Furthermore, its HALT-MTTF was less than 5000 min. Accordingly, the multilayer ceramic capacitor under Sample No. 8 was determined as not meeting the prescribed performance (x).

Sample No. 9 was difficult to sinter at or below 1250° C. Accordingly, the multilayer ceramic capacitor under Sample No. 9 was determined as not meeting the prescribed performance (x).

Sample Nos. 10, 11, 14 to 17, 19, 23, 24, 26, 30, 35, 38, 40, 44, 49, and 50 failed at least one of the tests for tan δ, rate of change in bias capacity, temperature characteristics (ΔC), and HALT-MTTF. Accordingly, the multilayer ceramic capacitors under these sample numbers were determined as not meeting the prescribed performance (x).

Sample Nos. 29, 34, 41, 47, and 51 were difficult to sinter at or below 1250° C. Accordingly, the multilayer ceramic capacitors under these sample numbers were determined as not meeting the prescribed performance (x).

Also, Sample Nos. 30 and 50 produced abnormal grain growth in the dialectic layers. Accordingly, the multilayer ceramic capacitors under these sample numbers were determined as not meeting the prescribed performance (x).

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2019-131810, filed Jul. 17, 2019, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A multilayer ceramic capacitor having a laminate body constituted by dielectric layers and internal electrode layers stacked alternately, wherein each of the dielectric layers comprises:
    $(Ba_{(1-x-y)}Ca_xSr_y)_m(Ti_{(1-z)}Zr_z)O_3$, where $0.03 \leq x \leq 0.16$, $0 \leq y \leq 0.02$, $0 < z \leq 0.02$, $0.99 \leq m \leq 1.02$, as a primary component; and
    an R oxide (R refers to one or more rare earth elements, each constituting its own oxide) by 1.0 to 4.0 mol in equivalent element of R on total per 100 mol of the primary component;
    an Mg compound by 0.2 to 2.5 mol in equivalent element of Mg per 100 mol of the primary component;
    an Mn compound by 0.1 to 1.0 mol in equivalent element of Mn per 100 mol of the primary component;
    a V compound by 0.05 to 0.3 mol in equivalent element of V per 100 mol of the primary component; and
    an Si compound by 0.2 to 5.0 mol in equivalent element of Si per 100 mol of the primary component.

2. The multilayer ceramic capacitor according to claim 1, wherein the R is at least one rare earth element selected from the group consists of Gd, Tb, Dy, Ho, Er, Tm, Yb, Lu, and Y.

3. The multilayer ceramic capacitor according to claim 1, wherein there are multiple R's, and an average ionic radius of the R's is 0.894 to 0.914 Å.

4. The multilayer ceramic capacitor according to claim 1, wherein a ratio by mol of a total of Ba, Sr and Ca, to a total of Ti and Zr, as contained in the dielectric layers, is 1.000 to 1.030.

5. A circuit board on which the multilayer ceramic capacitor according to claim 1 is mounted as a smoothing capacitor.

6. A manufacturing method for a multilayer ceramic capacitor, comprising steps of:
    preparing a material by adding, to 100 mol of a powder whose average grain size is 150 to 200 nm and primary component is $(Ba_{1-x1}Ca_{x1})_{m1}TiO_3$ ($0.03 \leq x1 \leq 0.16$, $0.99 \leq m1 \leq 1.02$), an R oxide (R refers to one or more rare earth elements, each constituting an oxide) by 1.0 to 4.0 mol in equivalent element of R in total per 100 mol of the primary component, an Mg compound by 0.2 to 2.5 mol in equivalent element of Mg, an Mn compound by 0.1 to 1.0 mol in equivalent element of Mn, an M compound (M refers to one or more elements selected from the group consisting of Ba, Ca, and Sr, each constituting a compound) by 0 to 5.0 mol in equivalent element of each M, a Zr compound by 0.1 to 2.0 mol in equivalent element of Zr, a V compound by 0.05 to 0.3 mol in equivalent element of V, and an Si compound by 0.2 to 5.0 mol in equivalent element of Si;
    forming green sheets from the material;
    printing internal electrode layers on the green sheets;
    cutting the printed green sheets and stack the cut green sheets to obtain a laminate;
    cutting the laminate to obtain laminate body chips;
    sintering the laminate body chips; and
    forming external electrodes on each of the laminate body chips.

7. The manufacturing method according to claim 6, wherein, in the step of sintering the laminate body chips, the laminate body chips are sintered at a temperature of 1,000° C. or higher for 30 to 300 seconds.

* * * * *